(12) United States Patent
Ohara

(10) Patent No.: US 7,954,527 B2
(45) Date of Patent: Jun. 7, 2011

(54) PNEUMATIC TIRE WITH TREAD HAVING BOTH END CLOSED GROOVE BOTTOM CONCAVE PORTIONS AND BOTH END OPEN GROOVE BOTTOM SIPES

(75) Inventor: Masaaki Ohara, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 824 days.

(21) Appl. No.: 11/844,670

(22) Filed: Aug. 24, 2007

(65) Prior Publication Data

US 2008/0053585 A1 Mar. 6, 2008

(30) Foreign Application Priority Data

Aug. 31, 2006 (JP) ................. 2006-235969

(51) Int. Cl.
*B60C 11/11* (2006.01)
*B60C 11/117* (2006.01)
*B60C 11/12* (2006.01)
*B60C 11/13* (2006.01)

(52) U.S. Cl. ......... 152/209.17; 152/209.21; 152/209.22; 152/DIG. 3; 152/902

(58) Field of Classification Search ............. 152/209.17, 152/209.21, 209.22, DIG. 3, 902
See application file for complete search history.

(56) References Cited

U.S. PATENT DOCUMENTS

| 5,909,756 | A  | * | 6/1999  | Miyazaki | 152/209.22 |
| 6,382,283 | B1 | * | 5/2002  | Caretta  | 152/209.22 |
| 6,409,861 | B1 | * | 6/2002  | Yukawa   | 152/209.2  |
| 6,481,480 | B1 | * | 11/2002 | Schuster et al. | 152/209.22 |
| 2005/0211354 | A1 | * | 9/2005 | Shinmura et al. | 152/209.22 |
| 2006/0169376 | A1 | * | 8/2006 | Sundkvist et al. | 152/209.22 |
| 2009/0090445 | A1 | * | 4/2009 | Itou | 152/209.18 |

FOREIGN PATENT DOCUMENTS

| JP | 10-86613 |   | 4/1998 |
| JP | 11-278016 | * | 10/1999 |
| JP | 2001-187517 | * | 7/2001 |
| JP | 2004-217120 |   | 8/2004 |
| WO | 2007/072717 | * | 6/2007 |

OTHER PUBLICATIONS

Machine translation for Japan 2001-187517 (no date).*
Machine translation for Japan 11-278016 (no date).*
Chinese Office Action for Application No. 200710143358.X, dated Jul. 8, 2010, 4 pages.

* cited by examiner

*Primary Examiner* — Steven D Maki
(74) *Attorney, Agent, or Firm* — Fish & Richardson P.C.

(57) ABSTRACT

A pneumatic tire provided with a tread pattern on which a plurality of blocks are formed with circumferential grooves which extend along a circumferential direction of the tire and lateral grooves which traverse the circumferential grooves, wherein the lateral groove disposed between the blocks on the endmost tread edge region has a depth from 10 to 50% of a depth of the circumferential groove to be traversed and has a groove bottom concave portion whose both ends in a longitudinal direction are disposed inside the groove bottom, and a width of the groove bottom concave portion, which is determined on the basis of the bottom plane of the groove bottom, is from 25 to 45% of a groove width of the lateral groove.

1 Claim, 5 Drawing Sheets (a)

(b)

(c)

(d)

(a)

(b)

(c)

PNEUMATIC TIRE WITH TREAD HAVING BOTH END CLOSED GROOVE BOTTOM CONCAVE PORTIONS AND BOTH END OPEN GROOVE BOTTOM SIPES

BACKGROUND OF THE INVENTION

1. Field of the Invention

The present invention relates to a pneumatic tire provided with a tread pattern on which a plurality of blocks are formed with circumferential grooves, which extend in a circumferential direction of the tire, and lateral grooves.

2. Description of the Related Art

As a pneumatic tire which secures driving performance on a snowy road without forming a sipe in a block, a pneumatic tire provided with a tread pattern shown by FIG. 8 or FIG. 9 is known. Such a pneumatic tire commonly has 4 to 6 circumferential grooves 1 that extend along a circumferential direction of a tire, and has relatively small blocks 10 partitioned by the circumferential grooves 1 and lateral grooves 2.

However, such a pneumatic tire has relatively small blocks, and therefore the blocks are apt to be deformed. This caused a problem of easy occurrence of toe and heel wear. Also, against a backdrop of the market, a demand on driving performance on a snowy road has been changing and economical efficiency (improvement of wear and irregular wear resistance) has become much important as a result of repletion of studless tires (improvement of driving performance on a snowy and icy road) and improvement in road surface conditions, and accordingly, a configuration that meets the above demand is being sought. That is, a demand on driving performance on a snowy road for a winter tire has been being specialized in driving performance on a road covered with shallow snow, and a demand for a tread pattern has been radically changing from a conventional tread pattern required shear force in the snow into a tread pattern required a scratching effect by an edge line of a block.

Also, there is a problem such that when relatively small blocks are formed on a tread edge region, deformation against action force upon evolution increases and evolution performance decreases.

Therefore, in Japanese Unexamined Patent Publication (Kokai) No. 10-86613, a pneumatic tire is proposed on a purpose of securing cornering force upon evolution, wherein lateral thin groove with a shallow bottom is formed between blocks on a tread edge region, a sipe is formed on the groove bottom of the lateral thin groove, and the sipe extends along the lateral thin groove and also has a discontinuity. Also, in the block on the tread edge region, a land portion sipe, which is a sublinear land portion sipe and is disposed to be subparallel to the above sipe, is disclosed.

However, in a tire described in Japanese Unexamined Patent Publication (Kokai) No. 10-86613, a groove width of the groove bottom sipe formed on the lateral thin groove was narrow, and therefore sufficient edge effect could not be exhibited when a tire wore out, and it was particularly hard to say that driving performance on a road covered with shallow snow was good enough. Also, there was a problem such that when a groove bottom sipe with both closed ends was formed on the groove bottom of the lateral thin groove having a shallow bottom, suppression effect on irregular wear was little, since the width of the lateral groove was narrow, the depth was shallow and the groove width of the groove bottom sipe was narrow, so as to decrease effect by virtue of the groove bottom sipe.

SUMMARY OF THE INVENTION

The object of the present invention is to provide a pneumatic tire which retains good driving performance particularly on a road covered with shallow snow while maintaining evolution performance, and is apt not to produce irregular wear such as toe and heel wear.

The above described object can be achieved by the present invention as follows.

That is, the present invention provides a pneumatic tire provided with a tread pattern on which a plurality of blocks are formed with circumferential grooves which extend along a circumferential direction of the tire and lateral grooves which traverse the circumferential grooves, wherein the lateral groove disposed between the blocks on the endmost tread edge region has a depth from 10 to 50% of a depth of the circumferential groove to be traversed and has a groove bottom concave portion whose both ends in a longitudinal direction are disposed inside the groove bottom, and a width of the groove bottom concave portion, which is determined on the basis of the bottom plane of the groove bottom, is from 25 to 45% of a groove width of the lateral groove.

According to the pneumatic tire of the present invention, the lateral groove disposed between the blocks on the endmost tread edge region is formed relatively shallowly, and both ends of the groove bottom concave portion are disposed inside the groove bottom, so that deformation against action force upon evolution is suppressed and evolution performance can be maintained. Also, since a width of the groove bottom concave portion is proper (wider than a common sipe), sufficient edge effect can be exhibited even when tire wear advances and, particularly, driving performance on a road covered with shallow snow is preferably maintained. In addition, since the width of the groove bottom concave portion is proper, when anteroposterior force is acted on the block, stress acting on an edge line of the block is alleviated, and thereby stepped wear is reduced. As a result, a pneumatic tire can be provided, which exhibits good driving performance particularly on a road covered with shallow snow while maintaining evolution performance, and also which is hard to produce irregular wear such as toe and heal wear.

In the pneumatic tire mentioned hereinbefore, it is preferable that a depth of the deepest part of the groove bottom concave portion is from 10 to 25% of the depth of the circumferential groove. By adjusting the deepest part of the groove bottom concave portion to such a depth, stress acting on the edge line of the block can be preferably alleviated when anteroposterior force is acted on the block, and also edge effect can be sure to be exhibited.

And also it is preferable that the block on the endmost tread edge region has a land portion sipe, which extends subparallel to the lateral groove disposed between the blocks and bends on the median side, and one end of the land portion sipe closes at a vicinity of the outer end of the block, while the other end thereof is open to the lateral groove. Since the other end of the land portion sipe is open to the lateral groove, the block edge is apt to move in a direction that cancels stepped wear, and therefore stepped wear in a longitudinal direction can be reduced. Also, since the land portion sipe extends subparallel to the lateral groove and bends on a median side, an edge component can be lengthened while maintaining a balance of block stiffness.

And also it is preferable that the grooves in the circumferential direction of the tire are composed of three circumferential grooves, the lateral groove disposed between these circumferential grooves has a depth from 40 to 70% of a depth of the circumferential groove and has a groove bottom sipe on the groove bottom of the lateral groove, and both ends of the groove bottom sipe are open. Herewith, the lateral groove disposed between the circumferential grooves has sufficient depth, and therefore the driving performance on a road covered with shallow snow becomes much better. In addition, since the lateral groove between the circumferential grooves is shallower than the circumferential groove, deformation by anteroposterior force of the block can be properly prevented, and also a sipe on the groove bottom of the lateral groove alleviates stress acting on an edge line of the block, when anteroposterior force is acted on the block. Therefore, stepped wear can be more decreased.

DETAILED DESCRIPTION OF THE PREFERRED EMBODIMENTS

Figure 1:
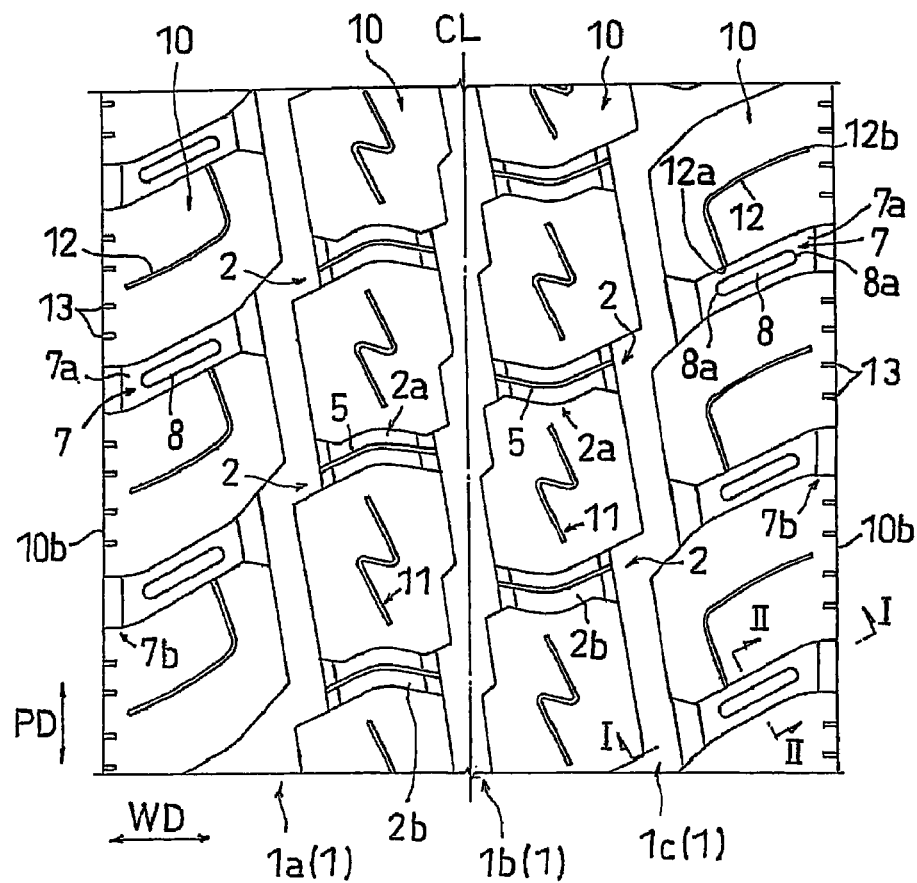
FIG. 1 is an elevation view showing an example of a tread pattern of a pneumatic tire of the present invention.
Figure 2:
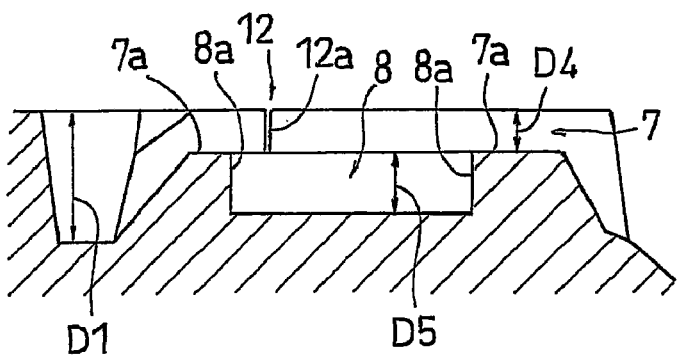
FIG. 2 is a cross sectional view in a direction of an arrow I-I of an example of a pneumatic tire of the present invention.
Figure 3:
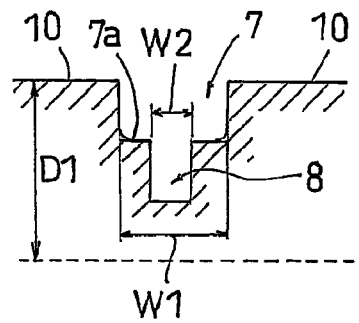
FIG. 3 is a cross sectional view in a direction of an arrow II-II of an example of a pneumatic tire of the present invention.
Figure 4:
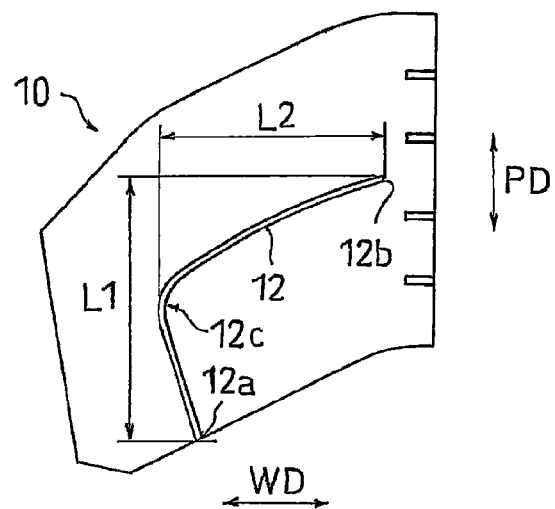
FIG. 4 is an enlarged view of a relevant part showing a block of an example of a pneumatic tire of the present invention.
Figure 5:
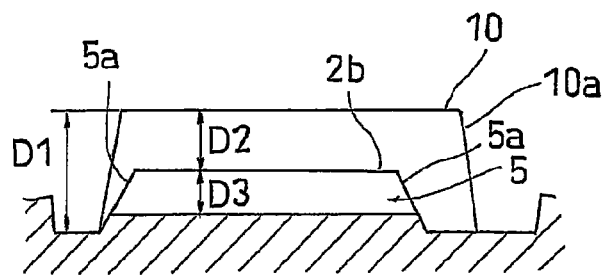
FIG. 5 is an enlarged view of a relevant part showing a fracture cross section fractured along a groove bottom sipe of a lateral groove bottom of an example of a pneumatic tire of the present invention.

Hereinafter, the embodiment of the present invention will be explained with referring to the drawings. FIG. 1 is an elevation view showing an example of a tread pattern of a pneumatic tire of the present invention. FIG. 2 is a cross sectional view in a direction of an arrow I-I, and FIG. 3 is a cross sectional view in a direction of an arrow II-II. FIG. 4 is an enlarged view of a relevant part showing a block. FIG. 5 is an enlarged view of a relevant part showing a fracture cross section fractured along a sipe on a groove bottom of a lateral groove on a median side.

The pneumatic tire of the present invention is, as shown in FIG. 1, provided with a tread pattern, on which a plurality of blocks 10 are formed with circumferential grooves 1 extending along the circumferential direction of the tire PD and lateral grooves 2 and 7 which traverse the circumferential groove 1. In the present embodiment, an example is shown, in which three circumferential grooves 1 are formed in a zigzag.

Some or all of three circumferential grooves 1 can be sublinear grooves, but preferably some circumferential grooves 1 have a zigzag pattern in view of improvement in driving performance on a snowy road, and more preferably all circumferential grooves 1 have a zigzag pattern.

The circumferential groove 1 in a zigzag pattern can be provided by forming a zigzag wall surface on the block 10 as shown by the circumferential groove in the middle 1b, by inclining a wall surface of the block 10 from the circumferential direction of the tire PD as shown by the circumferential grooves 1a and 1c on both sides, or by other methods.

Although three circumferential grooves 1 may be disposed on any position of the tire widthwise WD, it is preferable that the circumferential groove 1b in the middle is disposed in a vicinity of an equator line of the tire CL. And it is preferable that the circumferential grooves 1a and 1c on both sides are disposed such that the centers thereof are disposed within a region from 30 to 70% of a distance from an equator line of the tire CL to an edge line 10b of the block 10 on the tread edge region, and particularly within a region from 45 to 55%.

The lateral grooves 2 and 7 can be any as long as they traverse the circumferential groove 1, and they can be formed in the width direction of the tire WD or at an inclined angle from the width direction of the tire WD. In the present embodiment, an example is shown, in which the lateral groove 7 disposed on the tread edge further than the circumferential grooves 1a and 1c on both sides is formed at an inclined angle from the width direction of the tire WD, and also apertures of the lateral groove 7 on both sides are disposed out of alignment. Thus, by dislocating the apertures of the lateral groove 7 in the circumferential direction of the tire PD, pressure placed on the tread surface is uniformed and thereby irregular wear is reduced furthermore.

In the present invention, as shown in FIG. 2, the lateral groove 7 disposed between the blocks 10 on the endmost tread edge region has the depth D4 that is from 10 to 50% of the depth D1 of the circumferential grooves 1a and 1c to be traversed. However, it is preferable that the depth D4 of the lateral groove 7 is from 25 to 35% of the depth D1, in view of improvement in driving performance particularly on a road covered with shallow snow while maintaining evolution performance. Incidentally, the depth D1 of the circumferential groove 1 is commonly from 8 to 16 mm.

It is not necessary that the depth D4 of the lateral groove 7 is uniform throughout the entire lateral groove 7, and when the depth D4 varies, a mean value of the depth D4 should satisfy the above range. Incidentally, a groove width of the lateral groove 7 can be as the same width as that of the circumferential groove 1, but preferably from 5 to 10 mm, since it is preferred that the groove width is adjusted to be a little narrower than that of the circumferential groove 1 in order to retain an effect on reduction of stepped wear and to secure a longitudinal length of the block.

An example shown by way of the figure has a tapered region 7b on the tread edge of the lateral groove 7 which enlarges toward the edge, so that this visually prevents stepped wear from standing out and also allows a chain to be put on easily.

In the present invention, the groove bottom 7a of the lateral groove 7 has a groove bottom concave portion 8 whose both ends 8a in a longitudinal direction are disposed inside the groove bottom. The shape of the groove bottom concave portion 8 has a choice as will be described hereinafter, and it may be that bending along the shape of the lateral groove 7. In the present embodiment, an example is shown, in which a depth D5 and a width W2 are constant, and the groove bottom concave portion 8 has both ends 8a in a semispherical shape.

It is preferable that the both ends 8a of the groove bottom concave portion 8 are disposed within a range from 3 to 10 mm from the end of the groove bottom 7a in view of maintaining evolution performance. Incidentally, the groove bottom concave portion 8 is preferably formed near the center of a groove width of the lateral groove 7.

In the present invention, as shown in FIG. 3, the width W2 of the groove bottom concave portion 8, which is determined on the basis of the bottom plane of the groove bottom, is from 25 to 45% of the groove width W1 of the lateral groove 7, but it is preferable to be from 30 to 40% of the groove width W1 in view of a balance between evolution performance and driving performance on a road covered with shallow snow.

And also, the deepest depth D5 of the groove bottom concave portion 8 is preferably from 10 to 25% of the depth D1 of the circumferential grooves 1a and 1c and is more preferably from 15 to 20%, in view of relaxation of stress, which acts on an edge line of the block, and edge effect. The specific deepest depth D5 is preferably from 1.5 to 3 mm. Incidentally, it is not necessary that the depth D3 of the groove bottom concave portion 8 is entirely uniform.

In the present invention, as shown in FIG. 4, it is preferable that a land portion sipe 12 is formed, which extends subparallel to the lateral groove 7 disposed between the blocks and bends on a median side. A bend section 12c of the land portion sipe 12 is preferably in a circular arc shape in view of reducing stepped wear, and a curvature radius of the bend section 12c is preferably from 3 to 10 mm based on the center of the groove width of the land portion sipe 12.

And also, it is preferable that one end 12b of the land portion sipe 12 closes at a vicinity of the outer end 10b of the block, while the other end 12a is open to the lateral groove 7. In an example shown by way of the figure, a length L1 of the land portion sipe 12 in the circumferential direction of the tire PD is almost equal to the length L2 in the width direction of the tire WD.

Incidentally, the groove width of the land portion sipe 12 is preferably from 0.5 to 0.7 mm, and the groove depth of the land portion sipe 12 is preferably from 50 to 70% of that of the circumferential groove 1.

On the other hand, the lateral groove 2 disposed between the circumferential grooves 1 can be any as long as it traverses the circumferential groove 1, and it may be formed in the width direction WD of the tire or at an inclined angle from the width direction WD of the tire. In an example shown by way of the figure, the lateral groove 2 has a single bend section 2a in a circular arc shape, and the lateral groove 2 in a downturned shape and the lateral groove 2 in a reverse downturned shape are disposed in parallel on either side.

The curvature radius of the bend section 2a of the lateral groove 2 is preferably from 3 to 10 mm based on the edge line of the block 10 on a median side in view of reduction of stepped wear, although it may vary depending on an angle of the bend section of the lateral groove 2.

The lateral groove 2 disposed between the circumferential grooves 1 has, as shown in FIG. 5 for example, the depth D2 that is from 40 to 70% of the depth D1 of the circumferential groove 1, and preferably has the depth D2 that is from 50 to 60% of the depth D1 of the circumferential groove 1. By adjusting the depth D2 of the lateral groove 2 to the range, both driving performance on a road covered with shallow snow and a suppression effect on irregular wear can be ensured.

It is not necessary that the depth D2 of the lateral groove 2 is uniform throughout the entire lateral groove 2, and when the depth D2 varies, a mean value of the depth D2 should satisfy the above range. Incidentally, a groove width of the lateral groove 2 can be as the same length as that of the circumferential groove 1, but is preferably from 5 to 10 mm, since it is preferred that the groove width is adjusted to be a little narrower than that of the circumferential groove 1 in order to retain an effect on reduction of stepped wear and secure a longitudinal length of the block.

It is preferable that a groove bottom sipe 5 whose both ends 5a are open is formed on the groove bottom 2b of the lateral groove 2. Here, that both ends 5a are open denotes a state where the groove bottom sipe 5 is not closed inside the groove bottom 2b of the lateral groove 2 and the apertures 5a are laid on a wall surface on both sides.

It is preferable that the groove bottom sipe 5 is formed near the center of the groove bottom 2b of the lateral groove 2. Accordingly, it is preferable that when the lateral groove 2 has a bend section 2a, the groove bottom sipe 5 also has a bend section.

A depth D3 of the groove bottom sipe 5 is preferably from 15 to 30% of the depth D1 of the circumferential groove 1, in view of relaxation of stress that acts on an edge line of the block and reduction of stepped wear, and is more preferably from 15 to 25%. The depth D3 of the groove bottom sipe 5 is preferably from 1.5 to 2.5 mm in a specific term. Incidentally, it is not necessary that the depth D3 of the groove bottom sipe 5 is uniform entirely, and when the depth D3 varies, a mean value of the depth D3 should preferably satisfy the above described range.

A groove width of the groove bottom sipe 5 is preferably from 0.3 to 1.0 mm, and more preferably from 0.5 to 0.7 mm, in view of maintaining stiffness against anteroposterior force of the block 10 and preventing crack from occurring from the bottom of the sipe.

As shown in FIG. 1, it is preferable that the block 10 has the land portion sipe 11 whose length in the circumferential direction of the tire PD is longer than the length in the width direction of the tire WD. In an example shown by way of the figure, the land portion sipe 11 has two bend sections and also a sipe section between the bend sections, the sipe section extends in a direction at an angle from 70 to 1100 to the circumferential direction of the tire PD, and both ends of the land portion sipe 11 are closed inside the block 10.

The land portion sipe 11 can be any in its shape and size, but it is preferable to have a plurality of bend sections. With the bend sections, the edge line of the sipe is segmentalized and thereby an effect of visually preventing stepped wear from standing out is obtained.

A curvature radius of the bend section of the land portion sipe 11 is preferably from 2 to 5 mm based on the center of the groove width of the land portion sipe 11, in view of reduction of stepped wear.

And also, it is preferable to have a sipe section 11b between the bend sections 11a, and the sipe section 11b extends in a direction at an angle from 70 to 1100 to the circumferential direction of the tire PD, in view of improvement in braking performance and driving performance due to the edge effect.

Although both ends 11c of the land portion sipe 11 may be open to a wall surface 10a of the block 10, it is preferred that they are closed inside the block 10 in view of preventing irregular wear bounded by the land portion sipe.

Incidentally, a groove width of the land portion sipe 11 is preferably from 0.5 to 0.7 mm, and a groove depth of the land portion sipe 11 is preferably from 50 to 70% of that of the circumferential groove 1.

The pneumatic tire of the present invention is equivalent to common pneumatic tires except for being provided with the above tread pattern, and therefore any conventionally known arts such as materials, shapes, structures and production methods can be employed for the present invention.

The pneumatic tire of the present invention is good in terms of driving performance particularly on a road covered with shallow snow, and is provided with a tread pattern which is hard to produce irregular wear such as toe and heel wear, so as to be useful particularly as a winter tire, and among others as a tire for driving on a road covered with shallow snow. Incidentally, a road covered with shallow snow denotes a road surface that is covered with an amount of snow that falls in the Pacific Ocean side region on the lowland of the western Japan.

Other Embodiments

Hereinafter, other embodiments of the present invention will be explained.

(1) Although an example provided with the tread pattern on which the block shown in FIG. 1 is formed is explained in the above described embodiment, a shape of the block is not limited thereto and other shapes such as sub-square, rectangular, parallelogram, diamond shape and the like can be employed.

(2) Although an example provided with the groove bottom concave portion, wherein the depth and width are constant and both ends are semispherical, is explained in the above described embodiment, a groove bottom concave portion in the present invention can be formed in various shapes as shown in FIG. 6(a) to 6(d).

Figure 6:
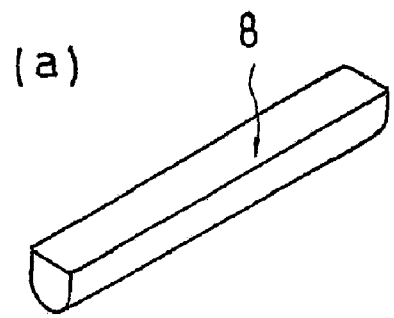
FIG. 6 is an enlarged view of a relevant part showing a groove bottom concave portion of other examples of a pneumatic tire of the present invention.
Figure 6:
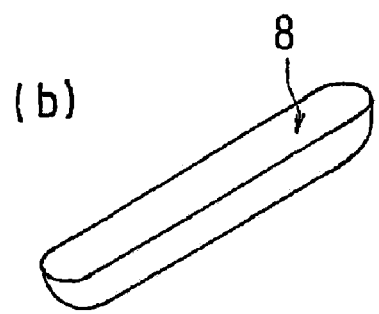
Figure 6:
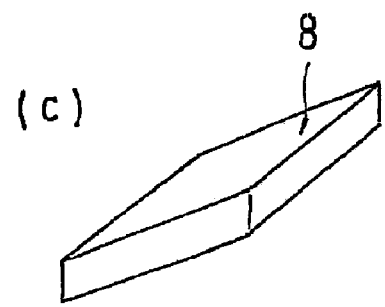
Figure 6:
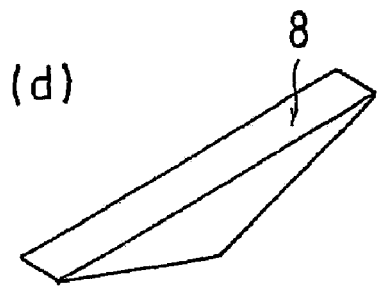

An example shown in FIG. 6(a) is provided with a groove bottom concave portion that has a constant depth and a U-shaped longitudinal sectional view. An example shown in FIG. 6(b) is provided with a groove bottom concave portion that has a constant depth, a U-shaped longitudinal sectional view and both ends formed in a spherical shape. An example shown in FIG. 6(c) is provided with a groove bottom concave portion that has a constant depth and a plane view in an elongated diamond shape. An example shown in FIG. 6(d) is provided with a groove bottom concave portion that has a plane view in an elongated rectangular shape and a depth that deepens toward the center in a longitudinal direction.

Figure 7:
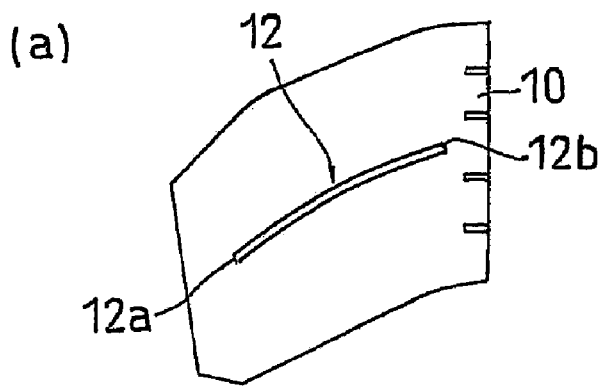
FIG. 7 is an enlarged view of a relevant part showing a block of other examples of a pneumatic tire of the present invention.
Figure 7:
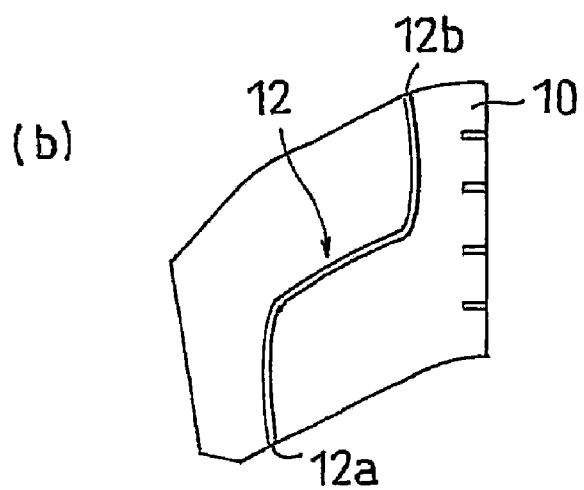
Figure 7:
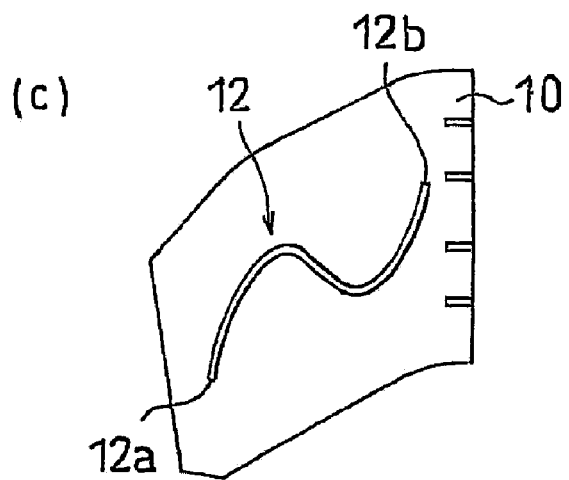

(3) In the above described embodiment, an example of forming a land portion sipe in a downturned shape on a block of a tread edge region is explained, but the present invention makes it possible to form a sipe in a various shape on the block of the tread edge as shown in FIG. 7(a) to 7(c).

In an example shown by FIG. 7(a), the land portion sipe 12 is formed on the block 10, and the land portion 12 extends subparallel to the lateral groove 7 disposed between the blocks 10 and has no bend section. Both ends 12a and 12b of the land portion sipe 12 are closed near edges of the block 10.

In an example shown by FIG. 7(b), the waveform land portion sipe 12 is formed on the block 10, which has both ends 12a and 12b that are open to the lateral grooves 7 disposed back and forth.

In an example shown by FIG. 7(c), a waveform land portion sipe 12 is formed on the block 10, which has both ends 12a and 12b that are closed near edges of the block 10.

(4) In the above described embodiment, the example of forming a land portion sipe in a reverse Z shape on the median side of the block was explained, but the present invention makes it possible to form a sipe in various shapes just like the case of forming a land portion sipe on a block on a tread edge region.

(5) In the above described embodiment, an example of the lateral groove having a single bend section was explained, but the lateral groove may have two or more bend sections. Also, alignment of lateral grooves is not limited to that in which lateral grooves in a downturned shape on the same side are disposed, in order, along the circumferential direction PD of the tire, but may be that in which a lateral groove in a downturned shape and a lateral groove in a reverse downturned shape are disposed alternately.

EXAMPLES

Hereinafter, the structure and effect of the present invention will be explained specifically by way of Examples and the like. Incidentally, evaluation of respective performance of a tire was conducted as follows.

(1) Driving Performance on Road with Shallow Snow

A tire was loaded on a test truck (small 2 ton truck), which was then driven on a road covered with shallow snow (snow depth of approx. 5 mm) under a load condition of one man riding to test straight drive, turn drive, braking and the like so as to evaluate the test truck by way of a sensory test of a driver. Incidentally, the evaluation is rated by an exponential figure when a conventional tire (Comparative Example 1) is rated as 100, and greater figures denote better results.

(2) Stepped Wear in Longitudinal Direction

A tire was loaded on a test truck (small 2 ton truck), and stepped wear loss (maximum elevation difference at an edge of a block before and after incurring wear) was measured under a load condition of one man riding when the test truck was driven for a distance of 8000 km on a dry paved roadway, and the evaluation was conducted by an exponential figure. Incidentally, the evaluation is rated by an exponential figure when a conventional tire (Comparative Example 1) is rated as 100, and greater figures denote better results. Also, a crack on a groove bottom concave portion was observed after termination of the test so as to evaluate presence or absence of a crack.

(3) Evolution Performance on Wet Road Surface

A tire was loaded on a test truck (small 2 ton truck). The test truck was driven on a wet road surface (no water depth) along a lemniscate curve (8 shape curve: circle of R=25 m) under a load condition of one man riding, and the lap time was evaluated by an exponential figure. Incidentally, the evaluation is rated by an exponential figure when a conventional tire (Comparative Example 1) is rated as 100, and greater figures denote better results.

Comparative Example 1

Conventional Tire

Figure 8:
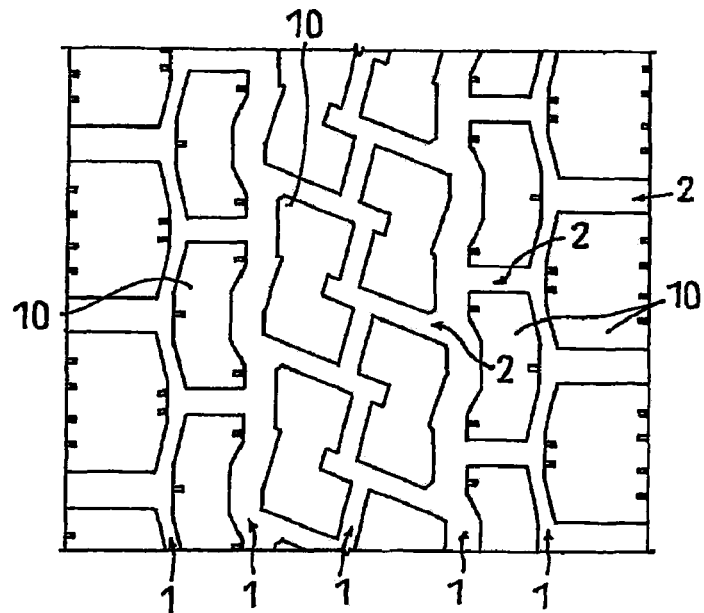
FIG. 8 is an elevation view showing is an example of a tread pattern of a conventional tire (Comparative Example 1)

In the tread pattern shown by FIG. 8, the depth of the circumferential groove and the lateral groove were adjusted to 12 mm, and a radial tire having a size of 195/85R16 was produced. Using the tire, evaluation on the above respective performance was conducted. The results are shown in Table 1.

Comparative Example 2

Conventional Tire

Figure 9:
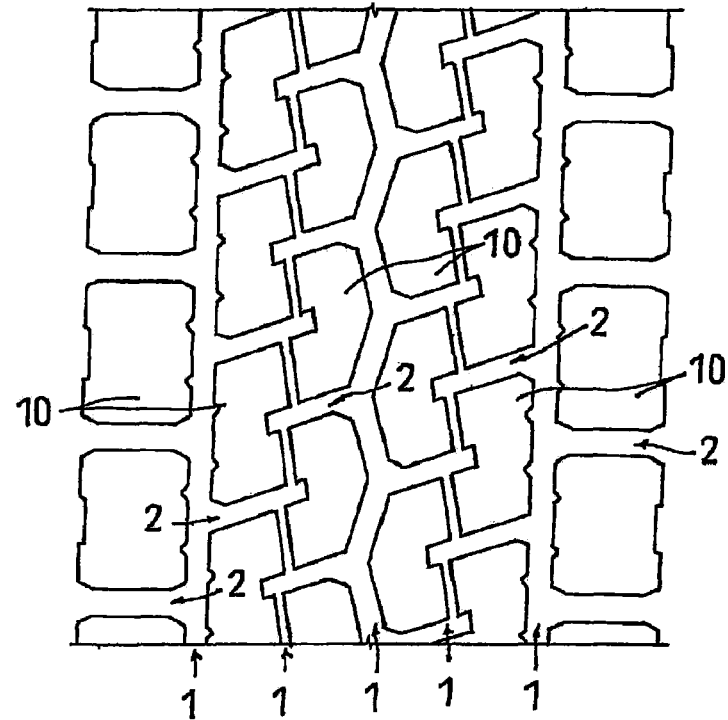
FIG. 9 is an elevation view showing is an example of a tread pattern of a conventional tire (Comparative Example 2).

In the tread pattern shown by FIG. 9, the depth of the circumferential groove and the lateral groove were adjusted to 12 mm, and a radial tire having a size of 195/85R16 was produced. Using the tire, evaluation on the above respective performance was conducted. The results are shown in Table 1.

Example 1

A radial tire having a size of 195/85R16 was produced by adjusting the depth of the circumferential groove 1 to 12 mm, and the groove width to 8.5 mm; the depth of the lateral groove 7 to 4.0 mm, the groove width to 6 mm and the length of the groove bottom to 5.8 mm; the depth of the groove bottom concave portion to 2.0 mm, the width to 2.0 mm and the length to 12 mm; the depth of the land portion sipe 12 to 6.5 mm, the groove width to 0.6 mm, L1=22 mm and L2=24 mm; the depth of the lateral groove 2 to 6 mm, the groove width to 6 mm and the curvature radius of the bend section to 10 mm; the size of the block on a median side to approximately 34 mm×34 mm; the depth of the groove bottom sipe 5 to 1.5 mm and the groove width to 0.6 mm; the depth of the land portion sipe 11 to 6.5 mm, the groove width to 0.6 mm, the circumferential length to 20 mm and the widthwise length to 7.5 mm in the tread pattern shown in FIG. 1. The evaluation results on respective performance of the tire will be shown in Table 1.

Example 2

A radial tire was produced in the same manner as in Example 1 except for forming a groove bottom concave portion (rectangular shape) having a depth of 3 mm, width of 2.5 mm and length of 18 mm. The evaluation results on respective performance of the tire will be shown in Table 1.

Example 3

A radial tire was produced in the same manner as in Example 1 except for forming a groove bottom concave portion (the shape is shown in FIG. 6(a)) having a depth of 1.5 mm, width of 1.5 mm and length of 5 mm. The evaluation results on respective performance of the tire will be shown in Table 1.

Comparative Example 3

A radial tire was produced in the same manner as in Example 1 except for disposing, instead of the groove bottom concave portion, a groove bottom sipe, which has the same length and depth as those of the groove bottom concave portion in Example 1 and a groove width of 0.6 mm. The evaluation results on respective performance of the tire will be shown in Table 1.

Comparative Example 4

A radial tire was produced in the same manner as in Example 1 except for disposing a groove bottom concave groove, which has the same width and depth as those of the groove bottom concave portion in Example 1 and has an extended length with open ends. The evaluation results on respective performance of the tire will be shown in Table 1.

Referential Example 1

A radial tire was produced in the same manner as in Example 1 except for forming the land portion sipe 12 (25 mm in length) in a shape shown by FIG. 7(a) instead of the land portion sipe 12. The evaluation results on respective performance of the tire will be shown in Table 1.

TABLE 1

|  | Comparative Example 1 | Comparative Example 2 | Example 1 | Example 2 | Example 3 | Comparative Example 3 | Comparative Example 4 | Referential Example 1 |
|---|---|---|---|---|---|---|---|---|
| Driving performance on road with shallow snow | 100 | 94 | 105 | 109 | 103 | 93 | 107 | 104 |
| Stepped wear in longitudinal direction | 100 | 102 | 115 | 113 | 118 | 107 | 103 | 108 |
| Evolution performance on wet road surface | 100 | 107 | 115 | 109 | 115 | 102 | 103 | 105 |
| Crack on groove bottom concave portion | — | — | absence | absence | absence | presence | presence | absence |

As shown by the results in Table 1, any of driving performance on a road covered with shallow snow, wear resistance performance and evolution performance on a wet road surface in the Examples were superior to those in conventional tires. In Comparative Example 3, on the other hand, driving performance on a road covered with shallow snow deteriorated since the groove bottom sipe was disposed instead of the groove bottom concave portion. Also, in Comparative Example 4, stepped wear in a longitudinal direction showed no difference from that of conventional tires since the groove bottom concave groove with open both ends was disposed. Incidentally, it is learned from the results of Referential Example 1 that stepped wear in a longitudinal direction improves when a land portion sipe having a bend section and an end open to a lateral groove is disposed.

What is claimed is:

1. A pneumatic tire provided with a tread pattern on which a plurality of blocks are formed with circumferential grooves which extend along a circumferential direction of the tire and lateral grooves which traverse the circumferential grooves,
    wherein each of the lateral grooves disposed between the blocks on the endmost tread edge region has a depth from 10 to 50% of a depth of the circumferential groove traversed and has a groove bottom concave portion whose both closed ends in a longitudinal direction are disposed inside the groove bottom, and a width of the groove bottom concave portion, which is determined on the basis of the bottom plane of the groove bottom, is from 25 to 45% of a groove width of the lateral grooves,
    wherein the grooves in the circumferential direction of the tire are composed of three circumferential grooves, the lateral grooves disposed between these circumferential grooves have a depth from 40 to 70% of a depth of the circumferential grooves and have a groove bottom sipe on the groove bottom of the lateral grooves, and both ends of the groove bottom sipe are open.

* * * * *